United States Patent [19]

Cabestany et al.

[11] 4,319,013
[45] Mar. 9, 1982

[54] POWDERED CATIONIC POLYELECTROLYTES, BASED ON ACRYLAMIDE AND QUATERNIZED OR SALIFIED DIMETHYL-AMINOETHYL ACRYLATE, PROCESS FOR PRODUCING THEM

[75] Inventors: Jean Cabestany, Stains; Claude Trouve, Paris; Dominique Depernet, Stains, all of France

[73] Assignee: Societe Francaise Hoechst, France

[21] Appl. No.: 905,609

[22] Filed: May 12, 1978

[30] Foreign Application Priority Data

May 16, 1977 [FR] France ................ 77 14994

[51] Int. Cl.$^3$ ............ C08F 2/00; C08F 6/14; C08F 28/02; C08F 220/38
[52] U.S. Cl. .................... 526/287; 526/71; 526/93; 526/207; 526/230; 526/292; 526/909; 526/923; 528/493; 528/501; 528/502; 528/503; 526/292.2; 524/922; 524/555; 524/815
[58] Field of Search ............ 260/29.6 WQ; 526/68, 526/71, 206, 207, 923, 292, 287; 528/493, 501

[56] References Cited

U.S. PATENT DOCUMENTS

| | | | |
|---|---|---|---|
| 3,321,451 | 5/1967 | Gander | 526/923 |
| 3,341,505 | 9/1967 | Gander | 526/923 |
| 3,547,950 | 12/1970 | Gander | 526/923 |
| 3,678,098 | 7/1972 | Lewis et al. | 526/923 |
| 3,901,857 | 8/1975 | Sackman et al. | 526/923 |
| 3,907,758 | 9/1975 | Sackman et al. | 526/923 |
| 3,927,199 | 12/1975 | Mitchelli et al. | 526/923 |
| 3,975,341 | 8/1976 | Trapasso | 526/207 |
| 4,037,040 | 7/1977 | Trapasso et al. | 526/71 |
| 4,075,183 | 2/1978 | Kawakami et al. | 526/78 |
| 4,077,930 | 3/1978 | Lim et al. | 526/207 |
| 4,078,133 | 3/1978 | Ozima | 526/206 |
| 4,138,446 | 2/1979 | Kawakami et al. | 526/78 |
| 4,138,539 | 2/1979 | Landolt et al. | 526/303 |
| 4,154,910 | 5/1979 | Tanaka et al. | 526/303 |
| 4,158,726 | 6/1979 | Kamada et al. | 526/292 |

FOREIGN PATENT DOCUMENTS

2295049  7/1976  France .
1388399  3/1975  United Kingdom .

*Primary Examiner*—Joseph L. Schofer
*Assistant Examiner*—Herbert J. Lilling
*Attorney, Agent, or Firm*—Karl W. Flocks

[57] ABSTRACT

Cationic polyelectrolytes in water-soluble powder form, applicable to the flocculation of municipal sludge comprise copolymers of acrylamide and of quaternized or salified dimethylamino-ethyl acrylate, containing in molar proportions 10 to 50% of cationic units distributed regularly along the copolymer chains. They have an intrinsic viscosity higher than 6 and a measured cationicity higher than 90% of the theoretical cationicity.

9 Claims, No Drawings

POWDERED CATIONIC POLYELECTROLYTES, BASED ON ACRYLAMIDE AND QUATERNIZED OR SALIFIED DIMETHYL-AMINOETHYL ACRYLATE, PROCESS FOR PRODUCING THEM

BACKGROUND OF THE INVENTION

1. Field of the Invention

The present invention relates to cationic polyelectrolytes in powder form, based on acrylamide and quaternised or salified dimethylaminoethyl acrylate, their process of production and their use for the treatment of urban wastes.

2. Description of the Prior Art

Within the domaine of the anti-pollution campaign, the treatment of urban waste waters in purification stations leads to municipal sludges which are advantageously dehydrated preparatory to their dumping or their firing. This dehydration is carried out essentially by filtration or by centrifugation and necssitates the addition to the muds of flocculants, either mineral (aluminum sulfate, ferric chloride), or organic (polyelectrolytes). The mineral flocculants have a certain number of drawbacks, among others: the often incorrect formation of floculate, the low mechanical strength of the floculate rendering these flocculants useless for centrifugation, the maintenance of a residual turbidity, high doses in utilization, etc. Also organic flocculants are more and more preferred, that is to say polyelectrolytes, and more especially high molecular weight water-soluble synthetic polymers. The latter may be nonionic, anionic or cationic. It is generally admitted that the cationic polyelectrolytes are the only ones capable of flocculating a mud derived from urban waste waters. Among the cationic polyelectrolytes, the copolymers of acrylamide and of cationic monomers are highly recommended and notably the copolymers of acrylamide and of quaternised or salified aminoalkyl acrylates or methacrylates. In fact, the patent literature supplies numerous formulae of copolymers of this type, but the examples described are very generally limited to copolymers of acrylamide and of quaternised or salified aminoalkyl methacrylates. In fact, it is difficult to find aminoalkyl acrylates commercially. The only one which is proposed is diethylaminoethyl acrylate, and the acrylates generally have the drawback of being much more sensitive to hydrolysis than the methacrylates, whence the difficulties to copolymerise them in aqueous media.

It is an object of the invention to provide improved water-soluble cationic polyelectrolytes in powder form in which the aforementioned drawbacks are minimized.

It is another object of the invention to provide a process for the production of such improved cationic polyelectrolytes.

It is a further object of the invention to provide improved methods of purifying urban muds by means of polyelectrolytes according to the invention.

Other objects and advantages of the invention will emerge from the description which follows.

GENERAL DESCRIPTION OF THE INVENTION

It has now been found that the copolymers of acrylamide and of quaternised or salified dimethylaminoethyl acrylate are distinctly superior to the copolymers of acrylamide and quaternised or salified aminoalcohol methacrylates as regards both the intrinsic viscosity and the cationicity and, for this reason, they are superior as flocculants for the treatment of urban muds.

The cationic water-soluble polyelectrolytes in powder form, according to the invention, are characterized by the fact that they are constituted by copolymers of acrylamide and of quaternised or salified dimethylaminoethyl acrylate, containing molar proportions of 10 to 50% of cationic units distributed regularly on the copolymer chains, that they have an intrinsic viscosity higher than 6 and a measured cationicity higher than 90% of the theoretical cationicity.

The dimethylaminoethyl acrylate used may be obtained, for example, by the action of dimethylaminoethanol on ethyl acrylate in the presence of an alkyl titanate (U.S. Pat. No. 2,822,348). The quaternisation is carried out according to known methods by means of dimethyl sulfate or methyl chloride, or any other alkyl halide. The salification is carried out by the action of a strong mineral acid, preferably hydrochloric acid. In this way the following cationic monomers are obtained:

$CH_2=CH-COOCH_2-CH_2-N^+(CH_3)_3$, $SO_4CH_3^-$ or MSA, $CH_2=CH-COOCH_2-CH_2-N^+(CH_3)_3, Cl^-$ or CMA, $CH_2=CH-COOH-CH_2-CH_2-N^+H(CH_3)_2$, $Cl^-$ or CHA.

In the remainder of this specification, the proportions in percent of the various monomers in the mixtures or in the copolymers will always be expressed in moles, a copolymer obtained from 70% of acrylamide (AAM) moles and 30% of MSA moles will be represented by 70/30—AAM/MSA.

In order to verify that differences existed in the regularity of the alternation of cationic units in the chains according as one copolymerises with acrylamide, a quaternised or salified dimethylaminoethyl acrylate, or a methacrylate, the reactivity ratios $r_1$ and $r_2$ were determined for the pairs acrylamide/dimethylaminoethyl acrylate quaternised by methyl chloride (AAM/CMA) and acrylamide/dimethylaminoethyl methacrylate quaternised by dimethyl sulfate (AAM/MSM), by two different methods (M. FINEMAN and S. D. ROSS—J. Polym. Sci. 5, 259 (1950)—F. R. MAYO and F. M. LEWIS—J. Am. Chem. soc. 66, 1944, corrected by A. I. YEZRIELEV, E. L. BROKHINA and Y. E. ROSKIN—Vyskmol. Soyed A 11 (8), 1670 (1969) ).

The following values were obtained:

Pair AAM/CMA, $r_1=0.72$, $r_2=0.66$,

Pair AAM/MSM, $r_1=0.23$, $r_2=2.15$.

It is hence observed that for the pair AAM/CMA, $r_1$ and $r_2$ are less than 1 and neighboring; it follows that one must obtain with this pair a more regular alternate distribution of cationic units along the chains than with the pair AAM/MSM for which $r_1$ is less than 1 and $r_2$ greater than 1.

By way of verification, there were established for mixtures of monomers of different compositions of the two preceding pairs, the composition curves of the copolymers as a function of the conversion ratio and the mean deviations were calculated for the copolymers with respect to the composition of the mixture of monomers. The results are assembled in the table below:

| Molar % of cationic | Standard Deviations | |
| --- | --- | --- |
| monomer | AAM/CMA | AAM/MSM |
| 10% | 1.7% | 8.3% |
| 20% | 2.3% | 13.9% |
| 30% | 1.8% | 17.1% |

| Molar % of cationic | Standard Deviations | |
|---|---|---|
| monomer | AAM/CMA | AAM/MSM |
| 50% | 0.8% | 17.9% |

It is hence well established that in the case of the pair AAM/CMA, the composition of the copolymers deviates less from the initial composition of the mixture of monomers than in the case of the pair AAM/MSM. The copolymers obtained from the pair AAM/CMA hence possess a more regular distribution of cationic units than those obtained from the pair AAM/MSM.

By way of illustration and expressing it differently, an AAM/MSM copolymer obtained from a mixture of monomers with 10% of MSM has, for example, 36% of its chains which contain less than 2% of cationic units whilst the corresponding AAM/CMA copolymer has only 1% of its chains which contain less than 2% of cationic units.

The copolymers according to the invention possess both an intrinsic viscosity always greater than 6 and a measured cationicity higher than 90% of the theoretical cationicity, although as will be seen below, the corresponding acrylamide/quaternised or salified dimethylaminoethyl methacrylate copolymers do not possess these two properties at the same time.

As regards the intrinsic viscosity $[\eta]$, the latter is determined according to the usual method at 30° C. in a molar solution of NaCl.

Moreover, the theoretical cationicity of the copolymers is denoted by the number of cationic milliequivalents theoretically present in the copolymer per gram of copolymer. For a copolymer of x% moles of acrylamide of molecular weight A and y% moles of cationic monomer of molecular weight B, that is to say for a copolymer whose average molecular weight $\overline{M}$ of a unit is $\overline{M}=(xA+yB)/100$, the theorectical cationicity is given by the formula $(10y/\overline{M})$.

The measured cationicity of the copolymers according to the invention is determined by a method derived from that described in "Mise au point de chimie analytique organique, pharmaceutique et bromatologique—J. A. GAUTIER et P. MALANGEAU, 17th serie, page 83—Masson and Cie, Editors, Paris," and which consists of estimating the cationic units by an 0.004 M aqueous solution of an anionic surface active agent, sodium dioctyl-sulfosuccinate, in a buffered water-chloroform medium, in the presence of methyl yellow. The measured cationicity is expressed in milliequivalents per gram.

It is observed that the copolymers according to the invention possess a measured cationicity which is always very close to the theoretical cationicity, whereas the corresponding copolymers with methacrylates instead of acrylates have measured cationicities close to the theoretical cationicities only for the copolymers with a high content of cationic units. A measured cationicity close to the theoretical cationicity indicates a good distribution of cationic units along the chains; in fact, when the cationic units are grouped instead of being distributed regularly, the chains have a tendency to form clusters in which the cationic units are not reached by the analytical reactants and no longer play their role correctly.

The table below gives the values of the intrinsic viscosity $[\eta]$, of theoretical cationicity and of the measured cationicity for a certain number of copolymers based on MSM, on CMM (methacrylate of dimethylaminoethyl quaternized with methyl chloride), on CMA or on CHA (acrylate of dimethylaminoethyl salified by HCl).

It was quite clear that the copolymers according to the invention have both an intrinsic viscosity greater than 6 and a measured cationicity higher than 90% of the theoretical cationicity and that it is not the same for copolymers containing methacrylates, which explains the better results obtained with the copolymers according to the invention in the treatment of urban muds. These results are established by means of two tests: a flocculation test and a filtration test. The first of these tests consists of flocculating the mud by stirring with a given amount of polyelectrolyte and of determining the half decantation time, that is to say the time taken by one-half the decanted portion to reach half the initial total height of the slurry or mud. By comparing by means of this test, muds from the Acheres purification station of the Paris urban center brought to 8 g/l, various copolymers used in the proportion of 2 kg/t (2 kg per ton of dry mud), the following results were obtained for the half decantation times:

AAM/CHA—70/30—22 seconds,
AAM/CHE—70/30—58 seconds,
AAM/MSM—70/30—8 minutes 30,
AAM/CMA—80/20—45 seconds,
AAM/CMM—80/20—4 minutes 30.
(CHE=acrylate of diethylaminoethyl salified by HCl).

| Cationic monomer | Molar % of cationic monomer | Theoretical cationicity | Measured cationicity | Theoretical cationicity / Measured cationcity | $[\eta]$ |
|---|---|---|---|---|---|
| MSM | 15 | 1.46 | 0.9 | 62% | 6.05 |
| MSM | 30 | 2.23 | 1.7 | 76% | 3.3 |
| MSM | 50 | 2.82 | 2.75 | 97% | <6 |
| CMM | 15 | 1.64 | 0.9 | 55% | — |
| CMM | 20 | 2.03 | 1.3 | 64% | — |
| CMM | 100 | 4.81 | 4.8 | 100% | 4.0 |
| CMA | 12 | 1.4 | 1.5 | 107% | 7.6 |
| CMA | 20 | 2.09 | 2.0 | 96% | 6.5 |
| CMA | 100 | | 5.1 | 99% | 9.1 |
| CHA | 20 | 2.16 | 2.0 | 93% | >6 |
| CHA | 30 | 2.89 | 2.8 | 97% | >6 |
| CHA | 50 | 3.99 | 3.8 | 95% | >6 |
| CHA | 100 | 5.56 | 5.9 | 106% | >6 |

A distinct superiority of the flocculating power of the products according to the invention is observed over the corresponding products based on diethylaminoethyl acrylate or methacrylate.

The second test consists of measuring the capillary suction time of the flocculated mud, which can be related to the specific resistance of the mud to filtration.

The apparatus, from Triton Electrics, comprises the filtration cell with a hollow metal cylinder resting on a WHATMAN No. 17 filter paper, and a recording unit, which enables measurement of the transit time of the aqueous phase (after having filled the cylinder with the flocculated mud) between two circles marked on the filter, of respective radii 32 and 45 mm.

The comparative results expressed in seconds are assembled in the table below, for Acheres muds at 8 g/l containing 4 kg/t of polyelectrolytes according to the invention or of comparison polyelectrolytes:

AAM/CHE—80/20—399 seconds,
AAM/CHA—80/20—28 seconds,
AAM/CHE—70/30—364 seconds,
AAM/MSM—70/30—163 seconds,
AAM/MSA—70/30—49 seconds,
AAM/CMA—70/30—21 seconds,
AAM/CHA—70/30—30 seconds.

A very distinct superiority is also observed for the copolymers according to the invention, both for copolymers based on diethylaminoethyl acrylate and on those based on dimethylaminoethyl methacrylate.

The polyelectrolytes according to the invention are hence particularly suitable for use in the flocculation of urban muds. They can be used in the proportion of 1 to 5 kg per ton of dry muds according to the nature of the muds.

As has been mentioned above, dimethylaminoethyl acrylate is much more easily hydrolysable than the corresponding methacrylates. By simply dissolving these products in water which gives a solution pH in the neighborhood of 11, it is observed that at 20° C., the methacrylate is very little hydrolysed (6% in 30 minutes), whereas in the same time, 50% of the acrylate is hydrolysed. At pH 5.5–6, hydrolysis of the acrylate is much less, in one hour it is 0.8% at 40° C. and 3.8% at 60° C., but it is still 4 to 5 times more rapid than that of the methacrylate. Hence it is a matter of controlling the copolymerisation of the quaternised or salified dimethylaminoethyl acrylate, notably in order to obtain the powdered polymer. It is possible to obtain relatively easily, copolymers of acrylamide and of quaternised or salified dimethylaminoethyl acrylate in solution in water by carrying out the copolymerisation at a suitable pH, but one thus obtains, even at low concentrations, gels which it is almost impossible to convert into powder.

For industrial use, it is preferable for the polyelectrolytes to be in powder form, easier and less expensive to transport than aqueous solutions. The present invention hence also includes an advantageous process for preparing polyelectrolytes according to the invention in powder form.

According to this advantageous method for preparing polyelectrolytes in powder form according to the invention, the copolymerisation of the monomers is carried out in an inverted water in oil type emulsion (that is to say, in water in the presence of a water immiscible organic solvent) and with an initiator, the pH comprised between 3 and 6, of preference between 4.5 and 6, and then dehydration is carried out at a temperature below 80° C., in order to avoid hydrolysis.

The dehydration, when the solvent allows, can be carried out by azeotropic distillation of the water, by means of said solvent to a moisture level which is not less than 10%, then drying on a fluidized bed at a temperature below 75° C.

It is also possible, when the solvent does not allow azeotropic dehydration, to separate the copolymer by decantation and to wash it with a solvent like acetone before drying it.

The organic solvent for polymerization which is used is an aliphatic or cyclanic hydrocarbon such as heptane, mixtures of branched $C_{10}$ to $C_{12}$ aliphatic hydrocarbons or cyclohexane. Heptane and cyclohexane are preferred since they permit azeotropic dehydration of the copolymer. The concentration of the monomers in the aqueous phase can vary from 40 to 70% and, as has been indicated above, the mixture of monomers can contain 10 to 50% of cationic monomer expressed in moles.

As an initiator, it is possible to use any conventional initiation system, for example photo-initiators in the presence of light, azo compounds, peroxides, organic hydroperoxides (benzoyl peroxide, cumene hydroperoxide) and alkali persulfates, alone or together, with, as activators, tertiary amines (dimethylparatoluidine, triethalnolamine), organic salts and complexes of transition metals (cobalt octoate (II), iron acetylacetonate (III)), sulfites, thiosulfates and alkali metabisulfites, etc.

The emulsifiers used are naturally those of low HLB (Hydrophilic-lipophilic balance), preferably the fatty esters of sorbitan, for example sorbitan monooleate.

DESCRIPTION OF PREFERRED EMBODIMENTS

The following examples are given purely by way of explanation and are to be regarded as in no way limiting the invention.

EXAMPLE 1

80/20 AAM/CMA Copolymer

Into a reactor are placed a solution of 4.29 kg of sorbitan monooleate in 409 kg of cyclohexane then, after purging the air, there is run in under nitrogen, with stirring, an aqueous solution of 127.4 kg of acrylamide and 86.8 kg of CMA (acrylate of dimethylaminoethyl quaternised with methyl chloride), at 20° C., brought to pH 5 with 20% ammonia so as to form an emulsion. After purging the air by passage of nitrogen, it is heated to 30° C. and a mixture of initiators constituted by 91.8 g of 70% cumene hydroperoxide in 2 l of cyclohexane and 406.5 g of iron acetylacetonate in 6 l of acetone is introduced; it is then heated slowly until initiation of polymerisation and then the reaction is allowed to continue until boiling under reflux. Towards 45° C. a solution of 6.43 kg of sorbitan monooleate in 5 kg of cyclohexane is introduced. It is kept for one hour at boiling point and then the water is removed by azeotropic distillation. When the water content of the solid is in the neighborhood of 10%, it is cooled, drained, and the drying is finished on a fluidized bed at 75° C., it is sifted and ground. In this way a product of a granulometry less than 1 mm, with 96% of dry extract is obtained. The 1% water solution has a viscosity of 3000 cp, measured at 20° C. in a BROOKFIELD RVT viscometer.

The intrinsic viscosity $[\eta]$ at 30° C. in a molar solution of NaCl is 7.2 and the measured cationicity is 2.0, namely 96% of the theoretical cationicity.

EXAMPLE 2

88/12 - AAM/CMA Copolymer

Into a reactor is placed a solution of 3.61 kg of sorbitan monooleate in 467 kg of cyclohexane; after having purged the air and placed it under nitrogen, there is run in a solution brought to pH 4.4 of 131.3 kg of acrylamide and 48.76 kg of CMA in 220 kg of demineralized water. It is brought to 30° C. and then there is introduced a mixture of 77.1 g of 70% cumene hydroperoxide in 2 l of cyclohexane and 341.6 g of Fe III acetylacetonate in 6 l of acetone. It is heated slowly and the heating is stopped as soon as polymerisation has started and then the temperature is allowed to rise. At 60° C., 5.42 kg of sorbitan monooleate in 5 kg of cyclohexane is introduced. After boiling at reflux, it is kept for one hour at 70° C.–72° C. and then it is dehydrated by azeotropic distillation by adding cyclohexane so as to keep a sufficient volume in the reactor. The distillation is stopped when about 188 kg of water has been removed, that is to say when the copolymer contains still about 15% of water.

It is cooled, drained, dried on a fluidized bed at 70° C., sifted and ground. The product obtained has a granulometry less than 1 mm; its dry extract is 97%. The viscosity of the 1% solution in distilled water is 2000 cp at 20° C.

The intrinsic viscosity $[\eta]$ at 30° C. in a molar solution of NaCl is 7.6 and the measured cationicity is 1.5, namely 107% of theory.

EXAMPLE 3

70/30 and 50/50 - AAM/CMA Copolymers

By using the same operational methods as in Example 1 copolymers are prepared containing respectively 30 and 50% of CMA in molar proportions.

The products obtained have the following characteristics: 70/30—AAM/CMA Copolymer Viscosity of the 1% solution at 20° C.: 2900 cp
50/50—AAM/CMA Copolymer
Viscosity of the 1% solution at 20° C.: 3300 cp (intrinsic viscosities $[\eta] > 6$)

EXAMPLE 4

AAM/CHA Copolymers

The operational method of Example 1 is carried out for copolymerisations with acrylamides/dimethylaminoethyl salified by HCl acrylate (CHA) mixtures; according to the molar proportions of CHA the following products are obtained:

| AAM/CHA Copolymers | Viscosity at 20 C of the 1% aqueous solution | Measured Cationicity | % of the Theoretical cationicity | $[\eta]$ |
|---|---|---|---|---|
| 80/20 | 3750 cp | 2.1 | 97.2% | |
| 70/30 | 3750 cp | 2.75 | 94.8% | $>6$ |
| 50/50 | 3650 cp | 3.8 | 95% | |

EXAMPLE 5

80/20 - AAM/CMA and AAM/CMM Copolymers

To a solution of 22 g of sorbitan monooleate in 820 g of cyclohexane are added under nitrogen and with stirring, a solution of 255 g of acrylamide and 174 g of CMA. After the passage of nitrogen for 30 minutes there is introduced at 30° C., 184 mg of 70% cumene hydroperoxide and 313 mg of iron III acetylacetonate dissolved at 5 ml of acetone. After some minutes the temperature rises to 70° C. It is kept for one hour at this temperature and then the water is removed by azeotropic distillation. When 480 g of water has been collected it is separated by filtration and dried for 30 minutes by pulsed air at 80° C., and then the product obtained is ground and sifted. The viscosity of the 1% solution of this product is 3750 cp at 20° C.; $[\eta] > 6$.

The measured cationicity is 2 meq/g, 96% of the theoretical cationicity.

The half decantation time for Acheres muds with 8 g/l containing 2 kg/t of the product is 45 seconds.

A test is carried out under the same conditions with the same molar proportions of monomers, replacing the CMA by CMM, namely 248 g of acrylamide and 181 g of CMM.

The viscosity at 20° C. of the 1% solution in water of the product obtained is 650 cp, the measured cationicity is 1.3 meq/g, namely 64% of the theoretical cationicity. The half decantation time for Acheres muds is 8 g/l containing 2 kg/t of the product is 4 minutes 30.

By replacing the acrylate by methacrylate one therefore obtains a viscosity and a cationicity which are much less and a half decantation time which is much longer.

EXAMPLE 6

To a solution of 21.5 g of sorbitan monooleate in 1060 g of a mixture of $C_{10}$ to $C_{12}$ branched hydrocarbons placed under nitrogen, is added, with stirring, a solution of 313 g of acrylamide and 116 g of CMA in 524 g of water (mixture of monomers containing 12% molar of cationic monomer). It is heated to 30° C. and 184 mg of 70% cumene hydroperoxide and 813 mg of iron III acetylacetonate dissolved in 5 ml of acetone are introduced. The heating is stopped as soon as the polymerisation has started and the temperature is allowed to rise to 70° C.; it is then kept for one hour at this temperature. After cooling the copolymer is allowed to deposit, the organic solvent is removed, and then the copolymer granules are washed twice by shaking with 1 l of acetone, it is filtered, dried for one hour at 80° C., ground and sifted.

The measured cationicity of the product obtained is 1.6 meq/g, namely 114% of the theoretical cationicity.

Copolymerisation is carried out under the same conditions, but with 252 g of acrylamide and 177 g of MSM (namely 15% of cationic monomer). The product obtained has a measured cationicity of 0.9 meq/g (62% of the theoretical cationicity).

Finally, copolymerisation still under the same conditions, 283 g of acrylamide and 146 g of CMM (namely 15% of cationic monomer) provides a product having a measured cationicity of 0.9 meq/g (55% of the theory).

Hence, the copolymers with 15% of methacrylates have cationicities of distinctly less than those of the copolymer according to the invention with only 12% of cationic monomer.

It is self-evident that the invention has only been described purely by way of explanation, and not in any way limiting, and that any useful modification within the framework of equivalents could be applied thereto without departing from its scope as defined by the appended claims.

We claim:

1. Cationic polyelectrolyte in water-soluble powder form, applicable to the flocculation of municipal sludge, said polyelectrolyte comprising a mixture of copolymers of acrylamide and of a cationic monomer of quaternised or salified dimethyaminoethyl acrylate; said mixture of copolymers consisting essentially of copolymers each containing in molar proportions 10 to 50% of cationic units spaced regularly along its copolymer chain; said mixture of copolymers having an intrinsic viscosity higher than 6 dl/g measured at 30° C. in a molar solution of NaCl, and a measured cationicity higher than 90% of the theoretical cationicity.

2. Polyelectrolyte according to claim 1, in which the dimethylaminoethyl acrylate is quaternised by a quaternisation reactant selected from the group consisting of dimethyl sulfate and methyl chloride.

3. Polyelectrolyte according to claim 1, in which the dimethylaminoethyl acrylate is salified by hydrochloric acid.

4. Cationic polyelectrolyte in water-soluble powder form, applicable to the flocculation of municipal sludge, said polyelectrolyte comprising a mixture of emulsion polymerized copolymers of acrylamide and of a cationic monomer of quaternised or salified dimethyaminoethyl acrylate; said mixture of copolymers consisting essentially of copolymers each containing in molar proportions 10 to 50% of cationic units spaced regularly along its copolymer chain; said mixture of copolymers having an intrinsic viscosity higher than 6 dl/g measured at 30° C. in molar solution of NaCl, and a measured cationicity higher than 90% of the theoretical cationicity.

5. Process for the manufacture of powder form cationic polyelectrolyte in water soluble powder form, applicable to the flocculation of municipal sludge, and comprising a copolymer of acrylamide and quaternised or salified dimethylaminoethyl acrylate, containing in molar proportions 10 to 50% of cationic units distributed regularly along the copolymer chain and having an intrinsic viscosity higher than 6 and a measured cationicity higher than 90% of the theoretical cationicity, said process comprising copolymerizing in an inverted water in oil emulsion acrylamide with quaternised or salified dimethylaminoethyl acrylate, at a pH between 3 and 6 in the presence of water emissible organic solvent and of an initiator, and dehydrating at a temperature below 80° C.

6. Process according to claim 5 wherein said copolymerisation takes place at a pH between 4.5 and 6.

7. Process according to claim 5, wherein the oil phase is constituted by a hydrocarbon selected from alkanes and cycloalkanes containing 6–9 carbon atoms.

8. Process according to claim 7, in which said oil phase is constituted by heptane or cyclohexane.

9. Process according to claim 7, in which the dehydration is carried out by azeotropic distillation of the water to a water content of the copolymer not less than 10% and the drying is terminated on a fluidized bed at a temperature below 75° C.

* * * * *

REEXAMINATION CERTIFICATE (814th)

United States Patent [19]

Cabestany et al.

[11] B1 4,319,013

[45] Certificate Issued  Feb. 2, 1988

[54] POWDERED CATIONIC POLYELECTROLYTES, BASED ON ACRYLAMIDE AND QUATERNIZED OR SALIFIED DIMETHYL-AMINOETHYL ACRYLATE, PROCESS FOR PRODUCING THEM

[75] Inventors: Jean Cabestany, Stains; Claude Trouve, Paris; Dominique Depernet, Stains, all of France

[73] Assignee: Societe Francaise Hoechst, France

Reexamination Request:
No. 90/001,161, Feb. 4, 1987

Reexamination Certificate for:
Patent No.: 4,319,013
Issued: Mar. 9, 1982
Appl. No.: 905,609
Filed: May 12, 1978

[30] Foreign Application Priority Data

May 16, 1977 [FR] France ................... 77 14994

[51] Int. Cl.$^4$ ............ C08F 2/00; C08F 6/14; C08F 28/02; C08F 220/38

[52] U.S. Cl. .................. 526/287; 524/922; 524/555; 524/815; 526/71; 526/93; 526/207; 526/230; 526/292; 526/909; 526/923; 526/292.2; 528/493; 528/501; 528/502; 528/503

[56] References Cited

U.S. PATENT DOCUMENTS 3,833,518  9/1974  Rubin .
3,948,740  4/1976  Phalangas .
4,137,969  2/1979  Phalangas et al. .

FOREIGN PATENT DOCUMENTS 2458561  of 0000  Fed. Rep. of Germany .
2431699  of 0000  Fed. Rep. of Germany .
7421382  of 0000  Japan .

Primary Examiner—Paul R. Michl

[57] ABSTRACT

Cationic polyelectrolytes in water-soluble powder form, applicable to the flocculation of municipal sludge comprise copolymers of acrylamide and of quaternized or salified dimethylamino-ethyl acrylate, containing in molar proportions 10 to 50% of cationic units distributed regularly along the copolymer chains. They have an intrinsic viscosity higher than 6 and a measured cationicity higher than 90% of the theoretical cationicity.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4 is confirmed.

Claim 5 is determined to be patentable as amended.

Claims 6–9, dependent on an amended claim, are determined to be patentable.

New claims 10 and 11 are added and determined to be patentable.

5. Process for the manufacture of powder form cationic polyelectrolyte in water soluble powder form, applicable to the flocculation of municipal sludge, and comprising a copolymer of acrylamide and quaternized or salified dimethylaminoethyl acrylate, containing in molar proportions 10–50% of cationic units distributed regularly along the copolymer chain and having an intrinsic viscosity higher than 6 and a measured cationicity higher than 90% of the theoretical cationicity, said process comprising
　copolymerizing in an inverted water-in-oil emulsion acrylamide with quaternized or salified dimethylaminoethyl acrylate, at a pH between 3 and 6 in the presence of a water [emissible] *immiscible* organic solvent and of an initiator *which is introduced into said inverted water-in-oil emulsion, and an emulsifying agent consisting essentially of an emulsifier having a low HLB value*, and dehydrating at a temperature below 80° C.

*10. Process according to claim 5, in which the initiator is selected from the group consisting of photoinitiators in the presence of light, azo compounds and organic hydroperoxides, optionally with an activator selected from the group consisting of tertiary amines and organic salts and complexes of transition metals.*

*11. Process for manufacture of powder form cationic polyelectrolyte in water soluble powder form, applicable to the flocculation of municipal sludge, and comprising a mixture of copolymer chains of acrylamide and quaternized or salified dimethyl-amino ethyl acrylate, containing in molar proportions 10–50% of cationic units distributed regularly along the copolymer chain and having an intrinsic viscosity higher than 6 dl/g and a measured cationicity higher than 90% of the theoretical cationicity, said process comprising*
　*copolymerizing in an inverted water-in-oil emulsion*
　*acrylamide with quaternized or salified dimethyl-amino ethyl acrylate,*
　*at a pH between 3 and 6 in the presence of a water immiscible organic solvent and a water insoluble initiator, said initiator being introduced into said inverted water-in-oil emulsion, and*
　*dehydrating at a temperature below 80° C. to produce a dry water soluble powdered polyelectrolyte.*

* * * * *